United States Patent
Hosono et al.

(10) Patent No.: US 8,805,422 B2
(45) Date of Patent: Aug. 12, 2014

(54) NETWORK DEVICE TO MONITOR RADIO BASE STATION AND A METHOD THEREOF

(75) Inventors: Hiroyuki Hosono, Yokohama (JP); Masafumi Masuda, Yokosuka (JP)

(73) Assignee: NTT Docomo, Inc., Tokyo (JP)

( * ) Notice: Subject to any disclaimer, the term of this patent is extended or adjusted under 35 U.S.C. 154(b) by 731 days.

(21) Appl. No.: 12/994,817

(22) PCT Filed: May 27, 2009

(86) PCT No.: PCT/JP2009/059659
§ 371 (c)(1),
(2), (4) Date: Mar. 7, 2011

(87) PCT Pub. No.: WO2009/145212
PCT Pub. Date: Dec. 3, 2009

(65) Prior Publication Data
US 2011/0171984 A1 Jul. 14, 2011

(30) Foreign Application Priority Data

May 27, 2008 (JP) ................................. 2008-138596

(51) Int. Cl.
*H04W 88/08* (2009.01)
*H04W 12/06* (2009.01)

(52) U.S. Cl.
USPC .......................... 455/456.5; 455/410; 455/561

(58) Field of Classification Search
None
See application file for complete search history.

(56) References Cited

U.S. PATENT DOCUMENTS

| 2002/0012331 | A1 | 1/2002 | Takano |
| 2006/0209799 | A1* | 9/2006 | Gallagher et al. ............ 370/352 |
| 2007/0206537 | A1* | 9/2007 | Cam-Winget et al. ........ 370/331 |
| 2008/0070565 | A1* | 3/2008 | Maeda .......................... 455/424 |
| 2008/0085722 | A1 | 4/2008 | Hirano et al. |

FOREIGN PATENT DOCUMENTS

| JP | 06 276164 | 9/1994 |
| JP | 2002-44006 | 2/2002 |
| JP | 2002-209253 | 7/2002 |
| JP | 2005 184719 | 7/2005 |
| JP | 2006 140563 | 6/2006 |
| WO | WO 2007/040453 A2 | 4/2007 |

OTHER PUBLICATIONS

Japanese Office Action issued Aug. 21, 2012, in Japan Patent Application No. 2010-514507 (with English translation).
Huawei, "Downlink Detection Functionality for HNB," 3GPP TSG RAN WG3 Meeting #60 R3-081146, total 2 pages, (Feb. 2008).

(Continued)

*Primary Examiner* — Philip Sobutka
(74) *Attorney, Agent, or Firm* — Oblon, Spivak, McClelland, Maier & Neustadt, L.L.P.

(57) ABSTRACT

A radio base station monitoring method includes (A) a first radio base station detecting a second radio base station having newly detected a common control channel and a second radio base station having stopped detecting the common control channel as second radio base stations with a change, (B) the first radio base station notifying a network device of information about the second radio base stations with a change, and (C) the network device using information about second radio base stations associated with the first radio base station and the information about the second radio base stations with a change, which has been notified, to stop the operation of at least one of the first radio base station or the second radio base stations.

12 Claims, 4 Drawing Sheets

(56) References Cited

OTHER PUBLICATIONS

International Search Report issued Aug. 4, 2009 in PCT/JP09/059659 filed May 27, 2009.

Office Action issued Feb. 22, 2013 in Chinese Patent Application No. 200980119567.8 with English language translation.

Office Action issued Apr. 15, 2014, in European Patent Application No. 09754720.2—1857 / 2282573 PCT/JP2009059659.

* cited by examiner

NETWORK DEVICE TO MONITOR RADIO BASE STATION AND A METHOD THEREOF

TECHNICAL FIELD

The present invention relates to a radio base station monitoring method and a network device for monitoring a radio base station.

BACKGROUND ART

In a mobile communication system, in general, a radio base station for public communications is configured to provide a communication service constantly once a network operator starts the operation of the radio base station for public communications, in order to meet connection requests issued from mobile stations at random.

For example, the following works are assumed to be performed when the network operator starts the operation of the radio base station for public communications.

In a first step, the network operator (maintainer) himself/herself turns on the power of the radio base station for public communications to open a line between the radio base station and an upper node after installing the radio base station for public communications and performing various wire connection and the like.

In a second step, various parameters are set in the radio base station for public communications via a network or by means of manual input by the network operator.

Then, once starting the operation of the radio base station for public communications while reflecting the various parameter setting, the network operator keeps providing a communication service by the radio base station for public communications without interruption as long as possible unless the radio base station for public communications is required to be rebooted due to a reason such as a failure or configuration change.

Further, when removing the radio base station for public communications, the network operator turns off the power of the radio base station for public communications after finishing providing the communication service by the radio base station for public communications.

Although the above operation is for the radio base station for public communications, basically the same operation as that on the radio base station for public communications is expected to be performed also on a radio base station placed in a small-sized area such as a house, like the one called a home radio base station (Home eNB).

SUMMARY OF THE INVENTION

However, the user is expected to purchase and install a home radio base station by himself/herself. This forces the user to perform the works of the first step and the second step described above, thus raising a concern that an installation location of the home radio base station may be unstable.

Further, the installation location of the home radio base station may possibly be moved at the user's convenience even after the installation location of the home radio base station is once registered in a mobile communication network correctly. Accordingly, it is necessary to develop a scheme for detecting that the installation location of the home radio base station has been moved in the mobile communication network and thereby performing the operation under a condition where the installation location of the home radio base station is correctly registered.

Conceivable methods for solving the above concern include a method of making the home radio base station implement a GPS function and thus acquiring location information of the home radio base station by using the GPS function.

This method allows constantly keeping track of the installation location of the home radio base station in the mobile communication network. However, the home radio base station needs to be equipped with the GPS function which is used only for the grasping of the installation location of the home radio base station. This hinders the provision of the home radio base station at low cost.

The present invention is therefore made in view of the aforementioned problem. An objective of the present invention is to provide a radio base station monitoring method and a network device which allow achieving consistency between an installation location of the home radio base station registered in the mobile communication network and an actual installation location of the home radio base station without making the home radio base station implement the GPS function.

A first aspect of the present invention is summarized as a radio base station monitoring method for monitoring a radio base station, the method comprise step A of causing a first radio base station to monitor common control channels of one or more second radio base stations which exist at a periphery of the first radio base station and to detect a second radio base station whose common control channel has been newly detected and a second radio base station whose common control channel has no longer been detected as a second radio base station with change, step B of causing the first radio base station to notify a network device of information on the second radio base station with change, and step C of causing the network device to stop an operation of at least one of the first radio base station and the second radio base stations by using information on the second radio base stations associated with the first radio base station and the thus-notified information on the second radio base station with change.

In the first aspect, wherein, in the step A, the first radio base station detects the common control channels by using a frequency, transmission timing, and spreading code which are allocated to each of the second radio base stations for transmitting a common control channel.

In the first aspect, wherein, in the step B, the first radio base station sends the network device identification information of each of the second radio base stations and at least one of a frequency, transmission timing, and spreading code which are allocated to the second radio base station for transmitting a common control channel, as the information on the second radio base station with change.

In the first aspect, wherein, in the step C, the network device compares the number of the second radio base stations with change with the number of a rest of the second radio base stations among the second radio base stations associated with the first radio base station, judges which of an installation location of the first radio base station and that of the second radio base station with change has been moved on the basis of a result of the comparison, and stops the operation of the radio base station having been judged that the installation location thereof has been moved.

In the first aspect, wherein, in the step C, the network device judges that the installation location of the second radio base station with change has been moved if the number of the second radio base stations with change is smaller than the number of the rest of the second radio base stations among the second radio base stations associated with the first radio base station.

In the first aspect, wherein, in the step C, the network device judges that the installation location of the second radio base station with change has been moved if a third radio base station is included in the rest of the second radio base stations.

In the first aspect, wherein, in the step C, the network device stops the operation of at least one of the first radio base station and the second radio base stations by transmitting an operation stop request signal.

The radio base station monitoring method according to claim 1, wherein the network device notifies a communication terminal corresponding to the radio base station whose operation has been stopped, to register information on the radio base station again.

A second aspect of the present invention is summarized as a network device used in a radio base station monitoring method for monitoring a radio base station, the device comprising a monitoring unit, the monitoring unit being configured such that, in a case where a first radio base station monitors common control channels of one or more second radio base stations which exist at a periphery thereof, detects a second radio base station whose common control channel has been newly detected and a second radio base station whose common control channel has no longer been detected as a second radio base station with change, and notifies the network device of information on the second radio base station with change, the monitoring unit stops an operation of at least one of the first radio base station and the second radio base stations by using information on the second radio base stations associated with the first radio base station and the thus-notified information on the second radio base station with change.

In the second aspect, wherein the monitoring unit compares the number of the second radio base stations with change with the number of a rest of the second radio base stations among the second radio base stations associated with the first radio base station, judges which of an installation location of the first radio base station and that of the second radio base station with change has been moved on the basis of a result of the comparison, and stops the operation of the radio base station having been judged that the installation location thereof has been moved.

In the second aspect, wherein the monitoring unit judges that the installation location of the second radio base station with change has been moved if the number of the second radio base stations with change is smaller than the number of the rest of the second radio base stations among the second radio base stations associated with the first radio base station.

In the second aspect, wherein the monitoring unit judges that the installation location of the second radio base station with change has been moved if a third radio base station is included in the rest of the second radio base stations.

In the second aspect, wherein the monitoring unit stops the operation of at least one of the first radio base station and the second radio base stations by transmitting an operation stop request signal.

In the second aspect, wherein the network device notifies a communication terminal corresponding to the radio base station whose operation has been stopped, to register information on the radio base station again.

As described above, according to the present invention, it is possible to provide a radio base station monitoring method and a network device which allow achieving consistency between an installation location of the home radio base station registered in the mobile communication network and an actual installation location of the home radio base station without making the home radio base station implement the GPS function.

BEST MODE FOR CARRYING OUT THE INVENTION (Configuration of Mobile Communication System According to First Embodiment of Present Invention)

A configuration of a mobile communication system according to a first embodiment of the present invention is described with reference to FIGS. 1 and 2.

Figure 1:
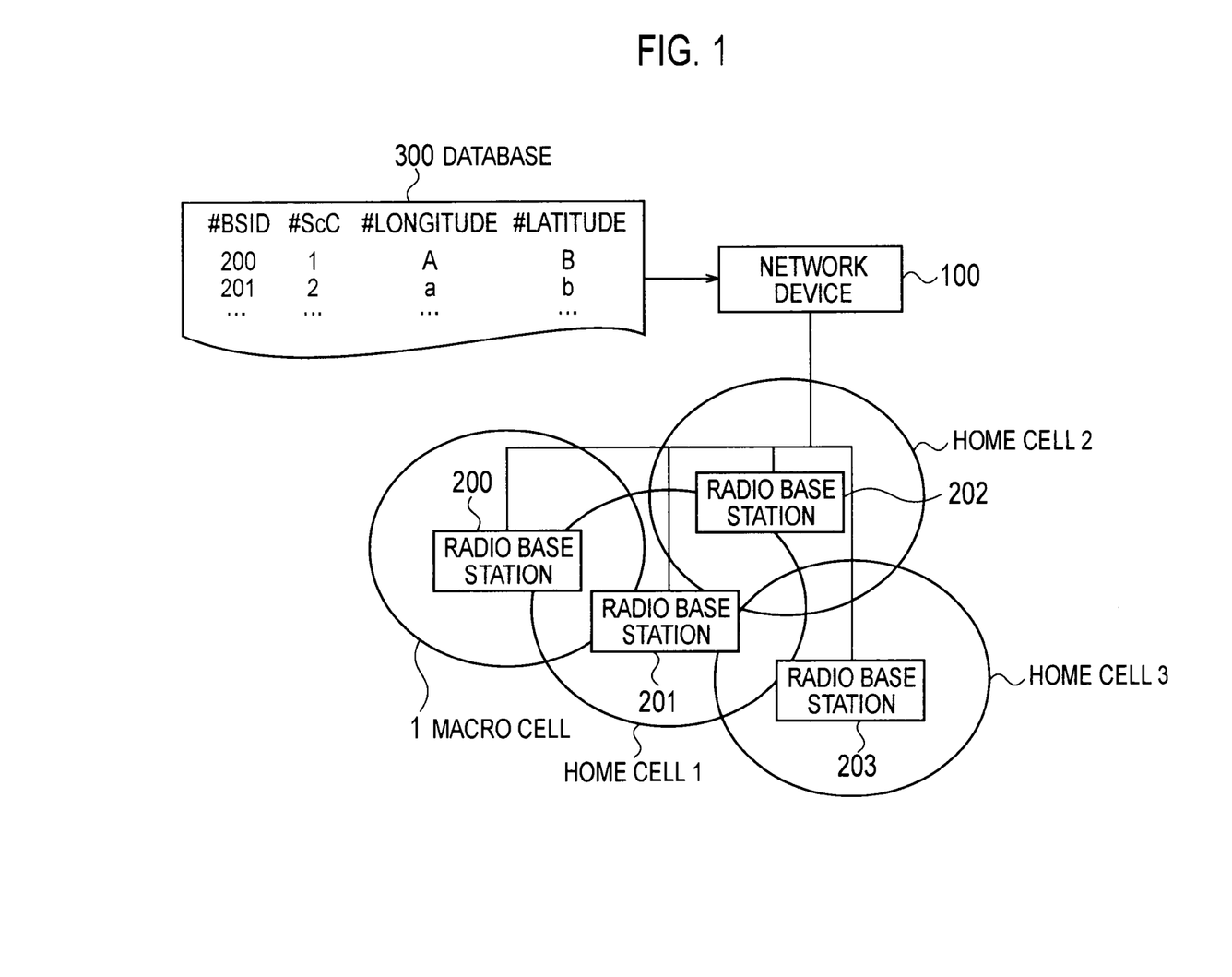
FIG. 1 is an overall configurational diagram of a mobile communication system according to a first embodiment of the present invention.

As shown in FIG. 1, the mobile communication system according to this embodiment includes a network device 100 and radio base stations 200 to 203 housed in the network device 100.

Here, the radio base station 200 (third radio base station) is a radio base station for public communications installed by a network operator (for example, a carrier or the like), and the radio base stations 201 to 203 (first radio base station and second radio base stations) are home radio base stations installed by users.

Moreover, the users can move the installation locations of their radio base stations 201 to 203, which are the home radio base stations, at their convenience.

A mobile station whose access to the radio base stations 201 to 203 is allowed or restricted by using an access list can be set in each of the radio base stations 201 to 203 which are the home radio base stations.

Each of the radio base stations 201 to 203 and the network device 100 are connected to each other via an inter-station control protocol.

Each of the radio base stations 201 to 203 (first radio base station) is configured to monitor radio base stations which exist at its periphery (second radio base stations), and to detect a second radio base station whose common control channel has been newly detected and a second radio base station whose common control channel has no longer been detected as a second radio base station with change.

More specifically, the first radio base station is configured to detect the common control channel by using a frequency, transmission timing, and spreading code which are allocated to each second radio base station for transmitting a common control channel.

The first radio base station is also configured to notify the network device 100 of information on the thus-detected one or more second radio base stations with change.

More specifically, the first radio base station is configured to send the network device 100 identification information of each second radio base station (BSID) and at least one of the frequency, transmission timing, and spreading code which are allocated to the second radio base station for transmitting a common control channel (radio parameter), as information (operation information) on the second radio base stations with change.

Each of the radio base stations 201 to 203 is also configured to stop its operation upon instruction from the network device 100, i.e., in response to an operation stop request signal transmitted from the network device 100.

Note that, if the mobile communication system according to this embodiment is a W-CDMA mobile communication system, the network device 100 is formed of a radio control device RNC, an exchange MSC/SGSN, or the like; if the mobile communication system according to this embodiment is a LTE (Long Term Evolution) mobile communication system, the network device 100 is formed of an exchange MME or the like.

Further, as shown in FIG. 1, a database 300 is connected to the network device 100.

In the database 300, operation information is stored which associates the identification information of each of the radio base stations 200 to 203 housed in the network device 100 (BSID) with the installation location (longitude, latitude, and the like) of the corresponding one of the radio base stations 200 to 203 and at least one of the frequency, transmission timing, and spreading code which are allocated to the corresponding one of the radio base stations 200 to 203 for transmitting a common control channel.

The operation information is used to detect location information of a mobile station in communication with each of the radio base stations 200 to 203.

It should be noted, however, that while the installation location of the radio base station 200 is highly reliable since this is measured by the network operator, the installation location of each of the radio base stations 201 to 203 is less reliable since this is freely changeable at the user's convenience.

Figure 2:
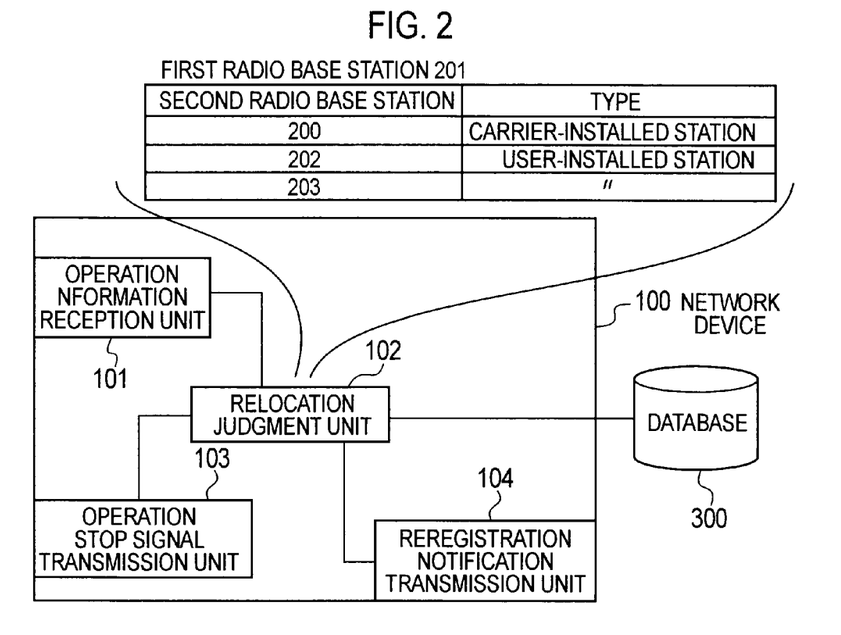
FIG. 2 is a functional block diagram of a network device forming the mobile communication system according to the first embodiment of the present invention.

Specifically, as shown in FIG. 2, the network device 100 includes an operation information reception unit 101, a relocation judgment unit 102, an operation stop signal transmission unit 103, and a reregistration notification transmission unit 104.

The operation information reception unit 101 is configured to receive the information (operation information) on each second radio base station notified by the first radio base station.

The relocation judgment unit 102 is configured to store the first radio base station in association with each second radio base station which exists at the periphery of the first radio base station.

Here, the relocation judgment unit 102 is configured to perform management on whether each second radio base station associated with the first radio base station is a home radio base station which is installed by a user (user-installed station) or a radio base station for public communications which is installed by a network operator (for example, a carrier or the like) (carrier-installed station, third radio base station).

The relocation judgment unit 102 is also configured to compare the number of the second radio base stations with change with the number of the rest of the second radio base stations (second radio base stations with no change) among the second radio base stations associated with the first radio base station, and to judge which of the installation location of the first radio base station and that of each of the second radio base stations with change has been moved, on the basis of the comparison result.

More specifically, the relocation judgment unit 102 is configured to judge that the installation location of each of the second radio base stations with change has been moved if the number of the second radio base stations with change is smaller than the number of the rest of the second radio base stations among the second radio base stations associated with the first radio base station.

The relocation judgment unit 102 is also configured to judge that the installation location of each of the second radio base stations with change has been moved if the radio base station for public communications (third radio base station) is included in the rest of the second radio base stations described above.

The operation stop signal transmission unit 103 is configured to stop the operation of at least one of the first radio base station and the second radio base stations by using the information on each second radio base station associated with the first radio base station and the information on each second radio base station with change thus notified.

More specifically, the operation stop signal transmission unit 103 is configured to stop the operation of the radio base station having been judged by the relocation judgment unit 102 that its installation location has been moved.

Here, the operation stop signal transmission unit 103 is configured to stop the operation of at least one of the first radio base station and the second radio base stations by transmitting an operation stop request signal.

The reregistration notification transmission unit 104 is a unit which notifies a communication terminal corresponding to the radio base station whose operation has been stopped by the operation stop signal transmission unit 103, to register information on the radio base station again.

Here, the communication terminal corresponding to the radio base station whose operation has been stopped by the operation stop signal transmission unit 103 includes a mobile station, a PC, and the like of the user who owns the radio base station, and is registered by the reregistration notification transmission unit 104 to be associated with each of radio base stations.

(Operation of Mobile Communication System According to First Embodiment of Present Invention)

An operation of the mobile communication system according to the first embodiment of the present invention is described with reference to FIGS. 3 and 4.

Figure 3:
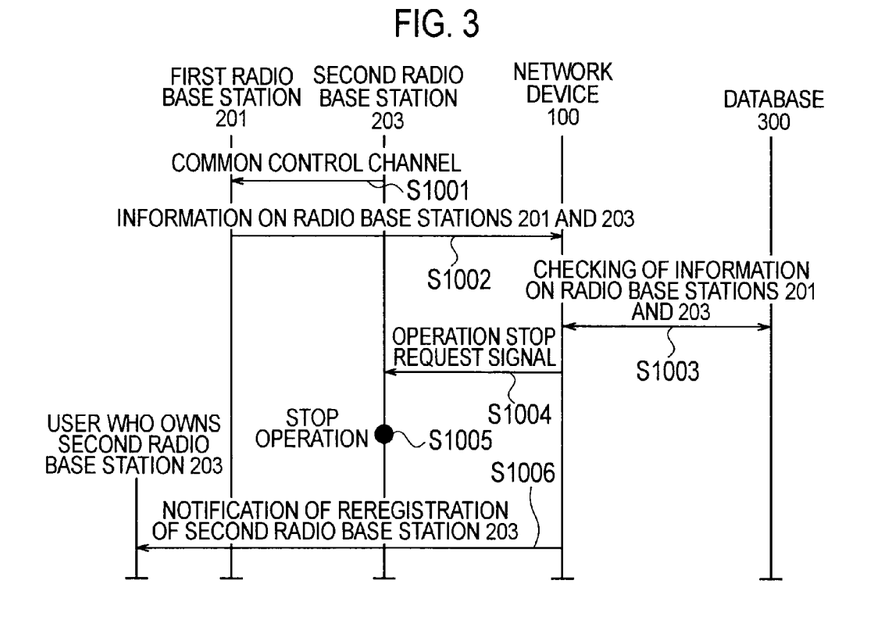
FIG. 3 is a sequence diagram showing an operation of the mobile communication system according to the first embodiment of the present invention.

FIG. 3 describes an operation of the case where the first radio base station 201 newly detects the second radio base station 203, and the network device 100 thereby finds the relocation of the second radio base station 203 and stops the operation of the second radio base station 203.

Note that, FIG. 3 describes an operation of the case where the first radio base station 201 has already recognized the radio base stations 200 and 202 as the second radio base stations which exist at its periphery, and newly detects the radio base station 203 as the second radio base station.

Moreover, the third radio base station 200 is a carrier-installed station (radio base station for public communications) installed by a network operator such as a carrier, and the fact that the installation location of the third radio base station 200 is highly reliable is also described in the database 300 of the network device 100.

As shown in FIG. 3, the first radio base station 201 repeatedly scans common control channels of the second radio base stations 200, 202, and 203 which exist at its periphery in Step S1001. If detecting the common control channel of the radio base station 203 for the first time, in Step S1002 the first radio base station 201 extracts information (operation information) on the second radio base station 203 via the common control channel, and notifies the network device 100 of the information on the second radio base station 203 (information on the second radio base station having been changed) and information (operation information and the like) on the station itself (first radio base station 201).

In Step S1003, the network device 100 having received the information on the radio base stations 201 and 203 (information on the second radio base station having been changed) checks the information on the radio base stations 201 and 203 registered in the database 300 against the information on the radio base stations 201 and 203 thus notified.

In the database 300, identification information of each radio base station, radio parameters used by the radio base station such as a spreading code, and an installation location of the radio base station are registered.

Here, the network device 100 checks the information on the radio base stations 201 and 203 registered in the database 300 against the information on the radio base stations 201 and 203 thus notified with respect to the identification information of and the radio parameters such as a spreading code of each radio base station. The network device 100 can thereby search out which of the radio base stations 201 and 203 registered in the database 300 is a radio base station with change and which of the radio base stations 201 and 203 is a radio base station with no change.

Meanwhile, the network device 100 judges whether or not any of the radio base stations 201 and 203 is relocated, and can thereby search out the installation location of the radio base station which is less reliable.

Hereinafter, with reference to FIG. 4, description is given of an operation for judging which of the installation locations of the radio base stations has been moved in the mobile communication system according to this embodiment.

Figure 4:
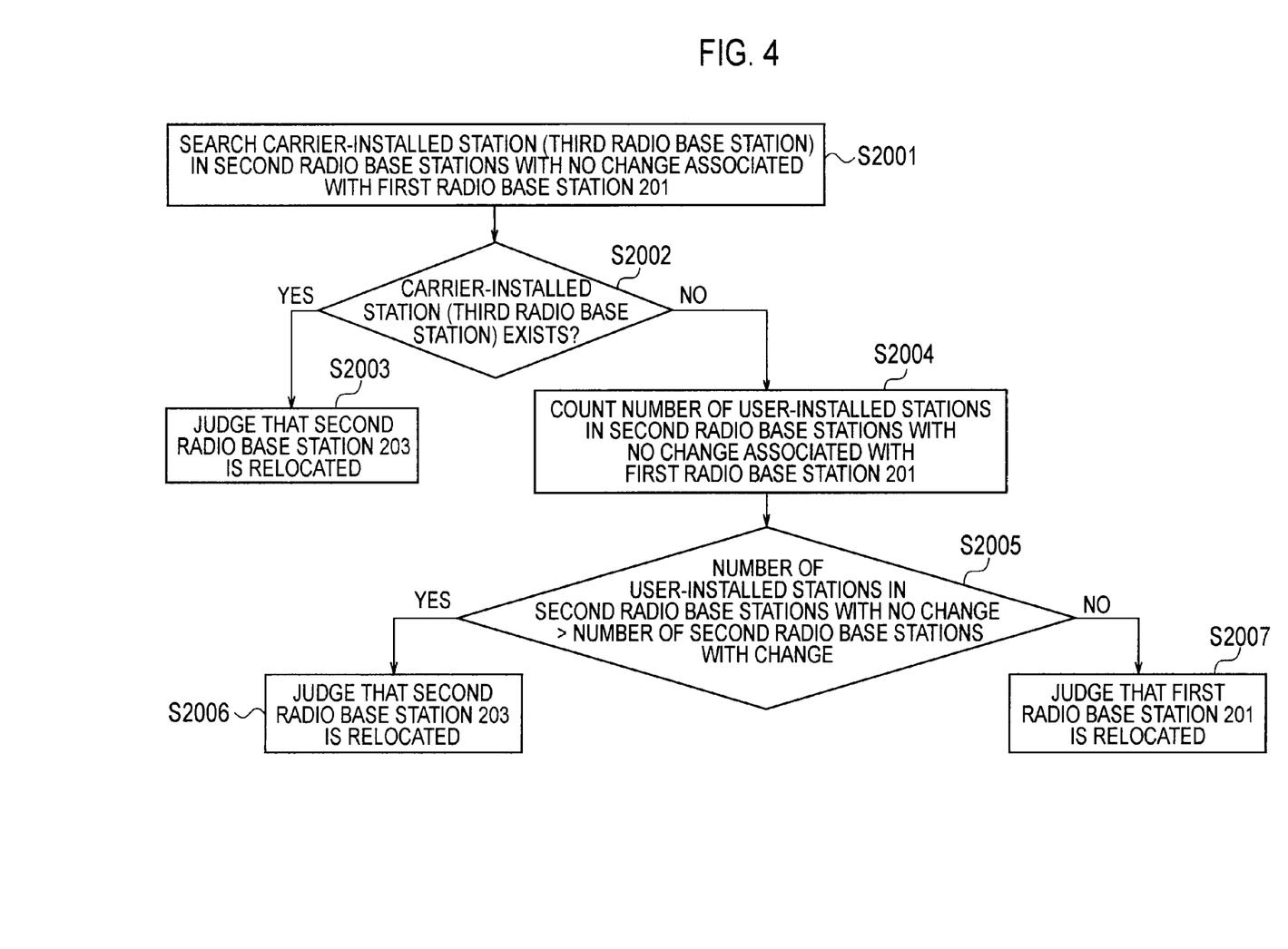
FIG. 4 is a flowchart showing an operation for judging which of installation locations of radio base stations has been moved in the mobile communication system according to the first embodiment of the present invention.

As shown in FIG. 4, in Step S2001, out of the second radio base stations associated with the first radio base station 201 in the database 300, the network device 100 detects radio base stations other than the second radio base station 203 with change, i.e., second radio base stations whose common control channels have been kept detected (second radio base stations with no change).

Then, the network device 100 judges whether or not a carrier-installed station (radio base station for public communications, third radio base station) whose installation location is highly reliable exists in the second radio base stations with no change.

If judging that the carrier-installed station exists (Step S2002), in Step S2003 the network device 100 deems that no change is made in the installation location of the first radio base station 201, and that the installation location of the second radio base station 203 has been moved (that is, the second radio base station 203 has been relocated).

On the other hand, if judging that the carrier-installed station does not exist (Step S2002), in Step S2004 the network device 100 counts the number of user-installed stations (home radio base stations) in the aforementioned second radio base stations with no change.

In Step S2005, the network device 100 judges whether or not the number of the user-installed stations (home radio base stations) thus counted in Step S2004 exceeds the number of the aforementioned second radio base stations with change.

If judging that the number of the user-installed stations exceeds the number of the second radio base stations with change, the network device 100 deems that the installation location of the second radio base station 203 has been moved (that is, the second radio base station 203 has been relocated) in Step S2006.

On the other hand, if judging that the number of the user-installed stations underruns the number of the second radio base stations with change, the network device 100 deems that the installation location of the first radio base station 201 has been moved (that is, the second radio base station 203 has been relocated) in Step S2007.

Note that, the order of the operation of Step S2002 in FIG. 4 and the operation of Step S2005 in FIG. 4 may be switched.

Refer back to FIG. 3. In this embodiment, it seems highly likely that the installation location of the second radio base station 203 has been moved. Thus, the network device 100 deems that the actual installation location of the second radio base station 203 is inconsistent with the installation location of the second radio base station 203 registered in the database 300, and transmits an operation stop request signal to the second radio base station 203 in Step S1004.

In Step S1005, the second radio base station 203 stops the operation of the station itself in accordance with the operation stop request signal thus received.

In Step S1006, the network device 100 notifies a communication terminal of the user who owns the second radio base station 203 (the communication terminal corresponding to the second radio base station 203) of the fact that the relocation of the second radio base station 203 has been detected, and sends the communication terminal a reregistration notice for prompting the user to reregister information on the second radio base station 203.

(Operations and Effects of Mobile Communication System According to First Embodiment of Present Invention)

The mobile communication system according to the first embodiment of the present invention is capable of detecting a change in the installation location of any of the home radio base stations 201 to 203 without making the home radio base stations 201 to 203 implement the GPS function. Thus, the mobile communication system can perform its operation under a condition where information on the home radio base stations 201 to 203 is correctly registered in a mobile communication network, and can thereby perform a service of correctly providing location information of a mobile station in communication with each of the home radio base stations 201 to 203.

First Modification Example

A mobile communication system according to a first modification example of the present invention is described with reference to FIG. 5. Hereinafter, the mobile communication system according to the first modification example of the present invention is described focusing on the difference from the aforementioned first embodiment.

Figure 5:
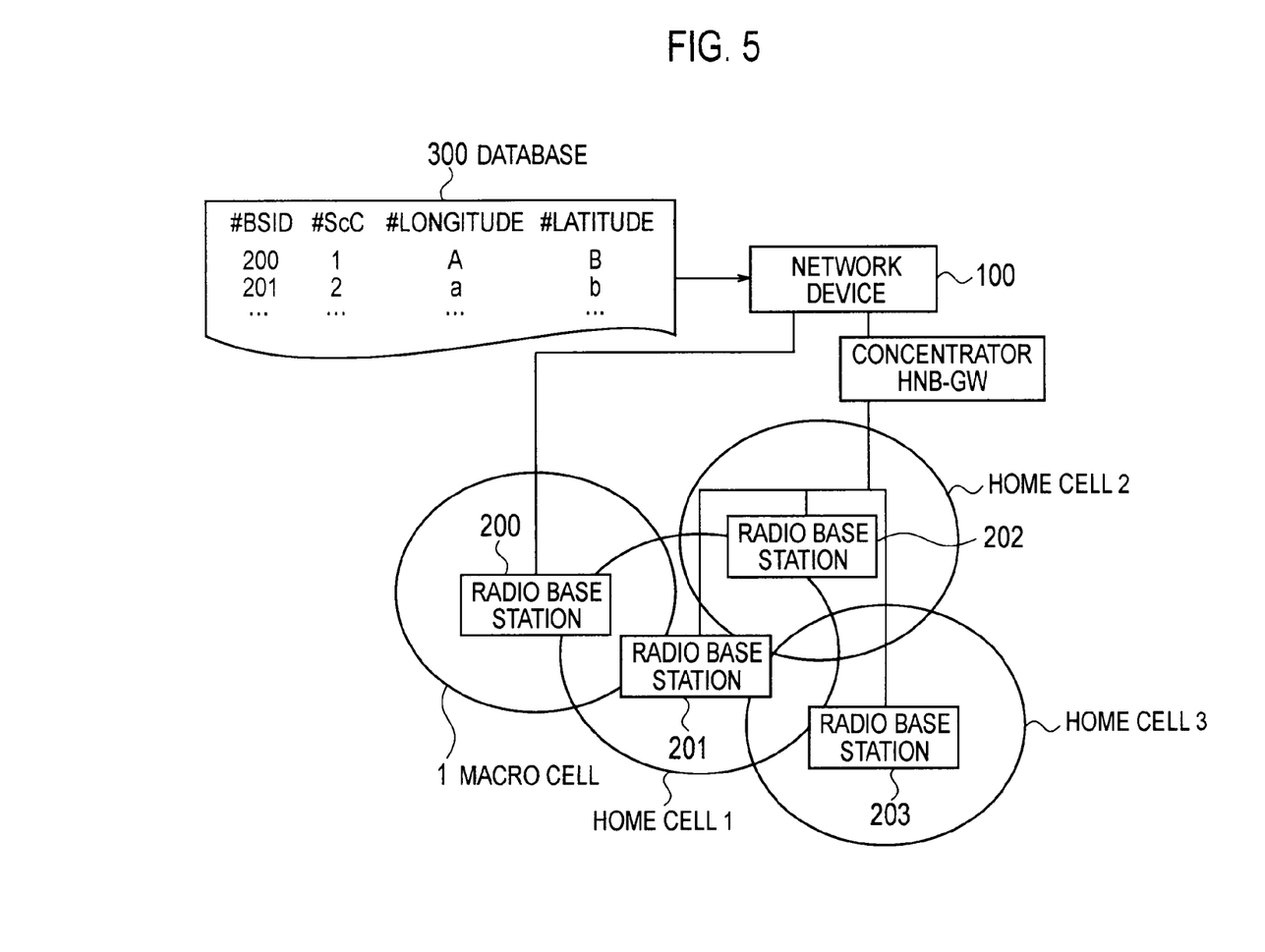
FIG. 5 is an overall configurational diagram of a mobile communication system according to a first modification example of the present invention.

As shown in FIG. 5, the mobile communication system according to the first modification example of the present invention includes a network device 100, a radio base station 200 and a concentrator HNB-GW which are housed in the network device 100, and radio base stations 201 to 203 housed in the concentrator HNB-GW.

In the mobile communication system according to the first modification example of the present invention, the concentrator HNB-GW may include a part of or all of the function of the aforementioned network device 100. Accordingly, in the mobile communication system according to the first modification example of the present invention, the concentrator HNB-GW may be called a network device.

Note that operation of the above described the radio base station 200, 201, 202, 203 and the network device 100 may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the radio base station 200, 201, 202, 203 and the network device 100. Also, the storage medium and the processor may be provided in the radio base station 200, 201, 202, 203 and the network device 100 as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A radio base station monitoring method for monitoring a radio base station, the method comprising:
    step A of causing a first radio base station to monitor common control channels of one or more second radio base stations which exist at a periphery of the first radio base station and to detect a second radio base station whose common control channel has been newly detected and a second radio base station whose common control channel has no longer been detected as a second radio base station with change;
    step B of causing the first radio base station to notify a network device of information on the second radio base station with change; and
    step C of causing the network device to stop an operation of at least one of the first radio base station and the second radio base stations by using information on the second radio base stations associated with the first radio base station and the thus-notified information on the second radio base station with change,
    wherein, in the step C, the network device compares the number of the second radio base stations with change with the number of a rest of the second radio base stations among the second radio base stations associated with the first radio base station, judges which of an installation location of the first radio base station and that of the second radio base station with change has been moved on the basis of a result of the comparison, and stops the operation of the radio base station having been judged that the installation location thereof has been moved.

2. The radio base station monitoring method according to claim 1, wherein, in the step A, the first radio base station detects the common control channels by using a frequency, transmission timing, and spreading code which are allocated to each of the second radio base stations for transmitting a common control channel.

3. The radio base station monitoring method according to claim 1, wherein, in the step B, the first radio base station sends the network device identification information of each of the second radio base stations and at least one of a frequency, transmission timing, and spreading code which are allocated to the second radio base station for transmitting a common control channel, as the information on the second radio base station with change.

4. The radio base station monitoring method according to claim 1, wherein, in the step C, the network device judges that the installation location of the second radio base station with change has been moved if the number of the second radio base stations with change is smaller than the number of the rest of the second radio base stations among the second radio base stations associated with the first radio base station.

5. The radio base station monitoring method according to claim 1, wherein, in the step C, the network device judges that the installation location of the second radio base station with change has been moved if a third radio base station is included in the rest of the second radio base stations.

6. The radio base station monitoring method according to claim 1, wherein, in the step C, the network device stops the operation of at least one of the first radio base station and the second radio base stations by transmitting an operation stop request signal.

7. The radio base station monitoring method according to claim 1, wherein the network device notifies a communication terminal corresponding to the radio base station whose operation has been stopped, to register information on the radio base station again.

8. A network device used in a radio base station monitoring method for monitoring a radio base station, the device comprising a monitoring unit, the monitoring unit being configured such that, in a case where a first radio base station monitors common control channels of one or more second radio base stations which exist at a periphery thereof, detects a second radio base station whose common control channel has been newly detected and a second radio base station whose common control channel has no longer been detected as a second radio base station with change, and notifies the network device of information on the second radio base station with change, the monitoring unit stops an operation of at least one of the first radio base station and the second radio base stations by using information on the second radio base stations associated with the first radio base station and the thus-notified information on the second radio base station with change,
    wherein the monitoring unit compares the number of the second radio base stations with change with the number of a rest of the second radio base stations among the second radio base stations associated with the first radio base station, judges which of an installation location of the first radio base station and that of the second radio base station with change has been moved on the basis of a result of the comparison, and stops the operation of the radio base station having been judged that the installation location thereof has been moved.

9. The network device according to claim 8, wherein the monitoring unit judges that the installation location of the second radio base station with change has been moved if the number of the second radio base stations with change is smaller than the number of the rest of the second radio base stations among the second radio base stations associated with the first radio base station.

10. The network device according to claim 8, wherein the monitoring unit judges that the installation location of the second radio base station with change has been moved if a third radio base station is included in the rest of the second radio base stations.

11. The network device according to claim 8, wherein the monitoring unit stops the operation of at least one of the first radio base station and the second radio base stations by transmitting an operation stop request signal.

12. The network device according to claim 8, wherein the network device notifies a communication terminal corresponding to the radio base station whose operation has been stopped, to register information on the radio base station again.

* * * * *